Sept. 27, 1955 R. HUBER 2,718,751
VEHICLE POWER PLANT, INCLUDING A TURBINE SYSTEM SUPPLIED
WITH POWER GAS FROM A FREE PISTON AUTO-GENERATOR
Filed June 28, 1950 2 Sheets-Sheet 1

INVENTOR
ROBERT HUBER
BY
ATTORNEYS

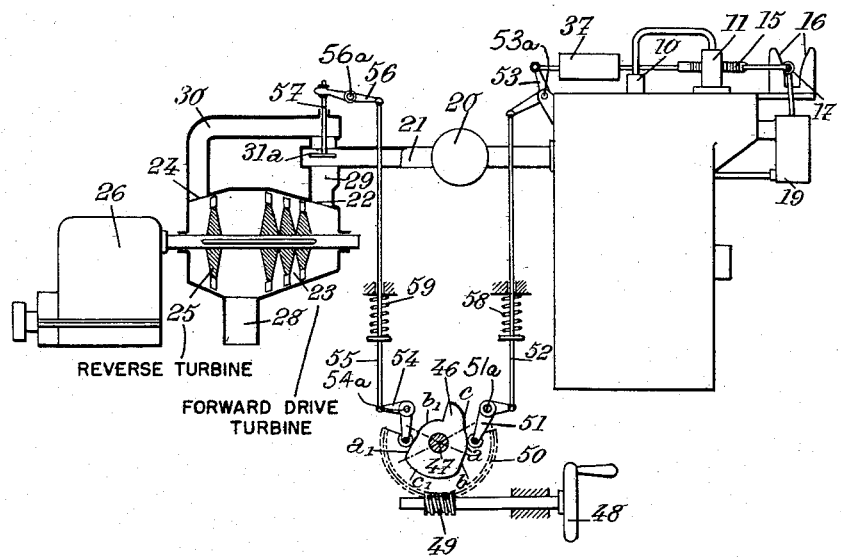

United States Patent Office 2,718,751
Patented Sept. 27, 1955

2,718,751

VEHICLE POWER PLANT, INCLUDING A TURBINE SYSTEM SUPPLIED WITH POWER GAS FROM A FREE PISTON AUTO-GENERATOR

Robert Huber, Bellevue, France, assignor to Societe d'Etudes et de Participations Eau, Gaz, Electricite, Energie, S. A., Geneva, Switzerland, a society of Switzerland Application June 28, 1950, Serial No. 170,807

Claims priority, application France July 16, 1949

4 Claims. (Cl. 60—13)

The present invention relates to power plants including at least one free piston generator to supply, at variable rate and pressure, power gases for feeding a gas turbine.

In such plants the pressure of the power gases supplied by the auto-generator and the mass of these gases increase when the load of the gas turbine increases and decrease when this load decreases.

Adaptation of the pressure and amount of gases supplied by the auto-generator to the requirements of the turbine takes place automatically, for all working conditions above a given power, by mere adjustment of the amount of fuel injected per cycle into the auto-generator. However, when the power, and consequently the pressure, of the gases supplied by the auto-generator, drop below a given value, the amount of gases which can be absorbed by the turbine becomes lower than the minimum amount that can be delivered by the auto-generator in view of the fact that the movable unit or units constituted by the free pistons of the auto-generator must always have a minimum stroke in order to open to a sufficient degree the inlet and exhaust ports of the power cylinder, which ports are controlled by the movable unit or units of the auto-generator.

Consequently, it is known to provide a plant of the kind in question with a discharge port located between the generator and the turbine intake and controlled through suitable means to cause a portion of the gases to be discharged to the outside before they reach the turbine when the power to be supplied by the turbine and consequently the output pressure of the generator drop below a given value. In these known plants, this gas discharge generally takes place to the atmosphere. On the contrary, the plant according to my invention is characterized by the fact that the discharge aperture is connected with the intake of a second turbine, constituted by at least one turbine wheel, driven by the gases discharged through this aperture.

According to a particularly interesting embodiment, chiefly adapted to the drive of a boat, the second turbine is arranged in such manner as to supply a torque in a direction opposed to that of the torque supplied by the first turbine, one of these turbines being used for forward propulsion and the other for backward propulsion.

In this last case, each of the two turbines may constitute, for certain working conditions, the main turbine which determines the direction in which the boat is propelled, whereas the other turbine is that which receives the excess of gas which is produced when the required power is lower than a predetermined value and consequently a portion of the gases supplied by the auto-generator is to escape before reaching the main turbine.

In this case, advantageously, the conduits which connect the free piston auto-generator with the intakes of the two turbines are provided with a control part arranged in such manner as to provide for the supply of only one of the turbines and the cut-off of the feed of the other one as long as the power supplied by the plant and consequently the pressure of the gases supplied by the auto-generator are higher than given values, while this part causes both turbines to be supplied with gas at variable pressures when the power and the pressure are lower than said given values.

Preferred embodiments of my invention will be hereinafter described with reference to the accompanying drawings, given merely by way of example and in which:

Fig. 1 diagrammatically shows a power plant made according to my invention and driving the screw propeller of a boat;

Fig. 4 shows a modification.

Figure 1:
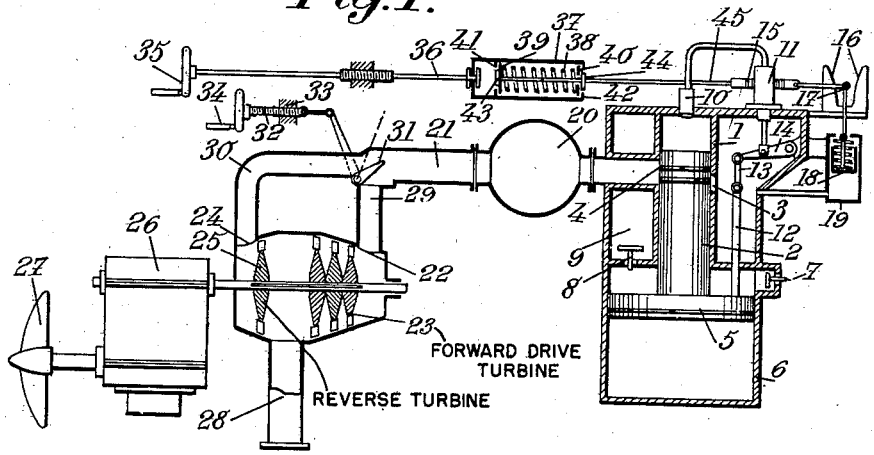

Concerning the auto-generator of the plant shown by Fig. 1, it includes a power cylinder 1 in which reciprocates at least one power piston 2, working preferably on the two-stroke Diesel cycle, this piston controlling the inlet ports 3 and exhaust ports 4 of power cylinder 1.

This power piston 2 is rigid with a compressor piston 5, the whole of these two pistons constituting what is called a "movable unit." Compressor piston 5 works in a compressor cylinder 6 one of the chambers of which, for instance that located on the inner side of piston 5, acts as compressor proper and is consequently fitted with an inlet valve 7 and a discharge valve 8, whereas the other chamber acts as a return energy accumulator which stores up the energy developed in the power cylinder during the outward stroke and gives back the accumulated energy to the movable units to achieve the inward stroke of the movable unit, during which air is compressed in the compressor chamber and discharged into the casing 9 of the auto-generator, while the air entrapped for supporting combustion in the power cylinder after the ports 3 and 4 thereof are closed is also compressed.

At the end of the inward stroke, fuel is injected into the highly compressed air in the power cylinder, this fuel injection taking place by means of an injector 10 supplied from a fuel pump 11 driven by movable unit 2—5 through a rod 12 rigid with said unit, a link 13 and a lever 14. Adjustment of the amount of fuel injected per cycle is achieved by means of an adjustment rod 15 which, for instance, rotates, in the known manner, the piston of injection pump 11 about its axis and the movements of which are limited by a part including two abutment surfaces 16. These surfaces 16 leave between them an interval for the displacement of a contact member 17 connected on the one hand to rod 15 and on the other hand to a piston 18 movable in a cylinder 19 where the pressure is equal to that prevailing in casing 9, which pressure is that under which power cylinder 1 is fed and corresponds to the pressure of the power gases which escape at the end of every outward stroke of the movable unit, through ports 4, into an intermediate reservoir 20.

From this reservoir the gases are fed, through conduits 21 and 29, to the intake 22 of a forward drive turbine including several wheels 23 and which serves to drive, through a speed reducing gear 26, the screw propeller 27 of a boat.

Figure 2:
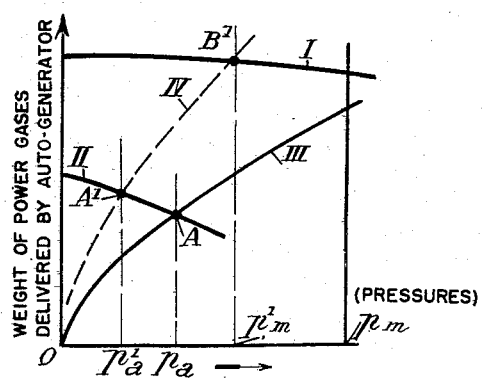

The working conditions of a free piston generator for supplying gases to a turbine are illustrated by the curves of the diagram of Fig. 2. In this diagram, the abscissas represent the pressures and the ordinates the amounts (in weight) of power gases delivered by the auto-generator. Curve I represents the maximum output of the auto-generator as a function of pressure and curve II the minimum output, this minimum output being determined by the fact that the movable unit or units of the auto-generator must always have a stroke sufficiently long for clearing to a sufficient degree, at the end of their outward movements, the inlet and exhaust ports of the power cylinder.

Curve III of Fig. 2 shows the amounts of power gas required by the turbine for different working pressures, the maximum value of which is $p_m$, these working pressures further indicating the power to be supplied by the turbine.

This diagram shows that the output of the auto-generator can be adapted to the requirements of the turbine only between maximum pressure $p_m$ and a pressure $p_a$ which corresponds to the point A of intersection of curves II and III. For low powers to be supplied by the turbine and when this turbine is running on no load, it is necessary to evacuate a portion of the gases supplied by the auto-generator by means of a by-pass. According to the invention, this by-pass, shown at 30, instead of evacuating the excess of gas directly to the atmosphere, supplies this excess to the intake 24 of a second turbine 25 which may be constituted by a single turbine wheel.

According to a particularly advantageous embodiment, turbine wheel 25 constitutes the reverse driving means for the screw propeller 27 of the boat and may be, for this purpose, mounted on the same shaft as the wheels of turbine 23.

Of course, with the above described arrangement, it is possible not only to make use, for low power and low pressure forward drive, of turbine 25 as receiver machine for the excess of gas which cannot be received by turbine 23, but also to make use, for backward running, of turbine 23 as receiver machine for the excess of gas which, for low powers, cannot be received by turbine 25. In this last mentioned case, conduit 29 acts as a by-pass for conduit 30.

In order to close, for each of the two turbines, the by-pass conduit as long as each of them is working under relatively high pressure and supplies a relatively high power, and in order to distribute in a variable fashion, for low pressures and low powers, the amounts of gas to be simultaneously fed to the two turbines, I provide a valve 31 at the place where conduits 29 and 30 branch off from feed conduit 21. This valve 31 either wholly closes the gas intake to one or the other of the turbines so that only the other one is supplied with gas, or causes both of them to be simultaneously supplied with gas in variable proportions when the power and pressure to be supplied are lower than the values corresponding to pressure $p_a$.

The curve IV of Fig. 2 shows the power gas consumption of the whole of turbines 23 and 25 when valve 31 is in an intermediate position which enables power gas to flow to both of the turbines and to escape through the common discharge conduit 28. It will be seen that curve IV intersects curve II (minimum output of the auto-generator) at a point $A_1$ corresponding to a pressure $p^1{}_a$. Curve IV intersects curve I at a point $B^1$ corresponding to a pressure $p^1{}_m$.

Therefore it is unnecessary to open a distinct by-pass as long as the output pressure of the generator is equal to or higher than $p^1{}_a$. As a rule, this pressure is sufficiently low to make it unnecessary to provide such a distinct by-pass. Or, if such a by-pass exists, discharge of the gases past it occurs very rarely. This results from the fact that for low power running conditions such as they occur, in particular during drive reversing periods, valve 31 is placed in an intermediate position so that both turbines are supplied with power gas in such proportions as to obtain a difference between the torques applied on the propeller 27 equal to the desired torque.

Figure 3:
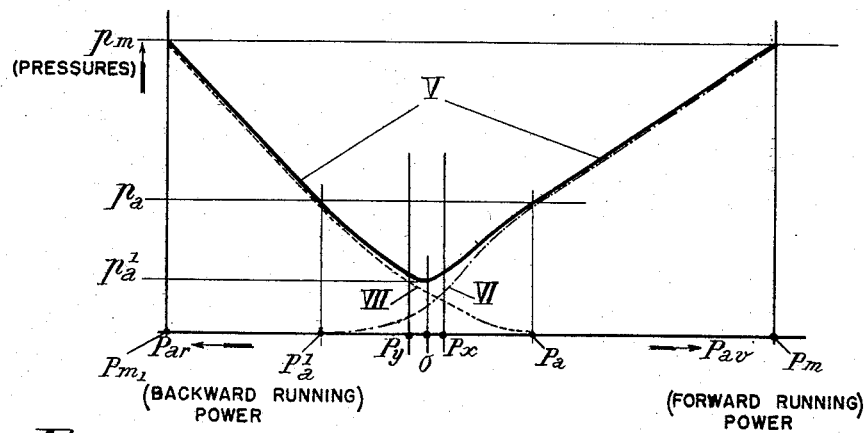
Figs. 2 and 3 are explanatory diagrams.

The operation of the above described plant is illustrated by the diagram of Fig. 3. In this diagram, the abscissas from point O toward the left indicate the backward running powers $P_{ar}$ and toward the right the forward running powers $P_{av}$. The ordinates indicate pressures. Curve V indicates the gas pressures supplied by the auto-generator.

When the boat is running forward and requires for its propulsion relatively high powers, the output pressures of the generator are practically identical to the pressures at the intake of turbine 23 and they range from the maximum pressure $p_m$ to pressure $p_a$ below which turbine 23 can no longer absorb the whole of the gases supplied by the auto-generator. The powers corresponding to said pressures $p_m$ and $p_a$ are indicated, on Fig. 3, by $P_m$ and $P_a$. As long as the powers required from turbine 23 range from $P_a$ to $P_m$, valve 31 fully closes conduit 30 and opens only conduit 29.

When the power required from turbine 23 drops below value $P_a$, valve 31 is opened so that a portion of the gases delivered by the auto-generator at a pressure lower than $p_a$ can pass through conduit 30 to turbine 25. This turbine is thus fed with gas and supplies a counter-torque which opposes the torque supplied by turbine 23, which permits of quickly reducing the power with which propeller 27 is driven. Due to the opening of conduit 30 and to the wire-drawing effect produced by valve 31, the pressures at the intakes of turbines 23 and 24 are no longer equal to the output pressure of the auto-generator but are lower. These intake pressures when conduits 29 and 30 are both open are shown by curve VI for turbine 23 and curve VII for turbine 25.

Between points $P_x$ and $P_y$, the powers of the two turbines balance each other, with an approximation due to friction, so that the driving power of propeller 27 is practically zero in this zone of the curves. At point O, halfway between $P_x$ and $P_y$, the gas pressure supplied by the auto-generator is equal to $p^1{}_a$. The whole of the gases that are supplied can therefore always pass through turbines 23 and 25 without requiring the opening of a special by-pass.

If, after stopping between $P_x$ and $P_y$, it is desired to start running backward, valve 31 is further moved in the direction corresponding to closing conduit 29 and opening conduit 30. The power of turbine 25 now has a preponderating action and conduit 29 constitutes the by-pass through which the excess of power gas which cannot be absorbed by turbine 25 is fed to turbine 23, and this as long as the power required from turbine 25 is not at least equal to power $P^1{}_a$ corresponding to the output pressure $p_a$ of the generator.

When the power required from turbine 25 becomes higher than $P^1{}_a$, valve 31 fully closes conduit 29 and only conduit 30 is open, and the output pressure of the auto-generator can become as high as the pressure $p_m$ which corresponds to the maximum power $P_{m_1}$ of turbine 25.

It should be noted that the fact that $P_m$ is higher than $P_{m_1}$, $P_a$ higher than $P^1{}_a$, and that the point of intersection of curves VI and VII is on the right hand side of O, is due to the higher efficiency of turbine 23 with respect to that of turbine 25. Thus, three zones of adjustment are obtained, the first between values $P_a$ and $P_m$ of the power of the forward running turbine, in which zone this turbine receives the whole of the gases delivered by the auto-generator and for which the pressure ranges from $p_a$ to $p_m$, the second zone between values $P^1{}_a$ and $P_{m_1}$ of the power of the backward running turbine, in which zone this last mentioned turbine also receives the whole of the gases that are delivered, the pressure of these gases ranging also from value $p_a$ to value $p_m$, and the third bone between values $P^1{}_a$ and $P_a$, in which zone both turbines are simultaneously fed with the gases delivered by the auto-generator, the output pressures of the auto-generator for this last mentioned zone ranging from $p^1{}_a$ to $p_a$ and one or the other of the turbines serving to receive the excess of gases.

The plant according to my invention makes it possible to pass quickly from forward running to backward running and inversely. For short stops it is not necessary to stop the auto-generator, but the amounts of gases supplied to the two turbines are adjusted in such manner that the torques exerted by the two turbines are equal and, consequently, the resultant torque is equal to zero.

Operations are thus considerably facilitated and are carried out with a highly favorable efficiency of the plant.

Concerning the means for controlling on the one hand valve 31 and on the other hand the adjustment rod 15 of the injection pump 11, they may be separate as shown by Fig. 1, where valve 31 is controlled through a transmission including a threaded rod 32 rotatable in a nut 33 under the action of a handwheel 34, whereas adjustment rod 15 is actuated by means of a handwheel 35 which controls a threaded rod 36 connected to said rod 15. However, it seems preferable to make use of a single control member which operates both valve 31 and adjustment rod 15. The modification shown by Fig. 4 is provided with such a single control member.

In this figure, the same reference numerals designate the elements that perform the same function as in the plant of Fig. 1.

In order to operate adjustment rod 15 and a valve 31a which works exactly in the same manner as valve 31 of Fig. 1, the plant of Fig. 4 includes a cam 46 the spindle 47 of which can be rotated from a handwheel 48 through an endless screw 49 and a toothed sector 50. This cam acts on the one hand, through a bell crank lever 51 having its fulcrum at 51a, a rod 52, a second bell crank lever 53 having its fulcrum at 53a and an elastic device 37 (which will be more explicitly referred to hereinafter), on said adjustment rod 15 and on the other hand, through a bell crank lever 54 having its fulcrum at 54a, a rod 55 and a lever 56 having its fulcrum at 56a, on the stem 57 of valve 31a. Springs 58 and 59 cause rollers mounted at the respective ends of levers 51 and 54 to bear against the edge of cam 46. When cam 46 is in the intermediate position, such as shown by Fig. 4, lever 51 cooperates with zone a of the cam outline, which zone is constituted by a circular arc having its center on the axis of spindle 47. Adjustment rod 15 is then in the position corresponding to minimum injection of fuel.

For this same intermediate position, lever 54 is in contact with zone $a_1$ of the cam outline, which corresponds to valve 31a opening both of the conduits 29 and 30. As long as zones a and $a_1$ of cam 46 cooperate with levers 51 and 54 respectively, the range of operation of the system is between powers $P_a$ and $P^1_a$, where the amount of fuel injected into the auto-generator is constantly kept at its minimum value, while both conduits 29 and 30 are simultaneously open, the sections of flow to these two conduits being however variable, according to the position of said valve 31a.

If cam 46 is rotated so that lever 51 cooperates with zone b of cam 46, while lever 54 cooperates with zone $b_1$, the plant is operating within the $P_a$ to $P_m$ range of powers (Fig. 3), for which conduit 29 is fully opened while rod 15 is moved so as to increase the rate of injection of fuel as cam 46 is being rotated in anti-clockwise direction, in order to increase the power supplied.

On the contrary, if cam 46 is rotated so as to place the end of lever 51 in contact with zone c and the end of lever 54 in contact with zone $c_1$ of the cam, the plant is operating within the $P^1_a$ to $P_{m_1}$ range of powers (Fig. 3), that is to say conduit 29 is fully closed whereas the amount of fuel that is injected increases as the cam is being rotated in clockwise direction.

Elastic device 37, which is inserted, in both of the embodiments shown by Figs. 1 and 4, between the pump injection adjusting member 15 and its control member is necessary in order to make sure that the limits imposed on the movements of rod 15 by abutment surfaces 16 are complied with. This elastic device may be constituted by a sleeve 37 rigid with rod 36 only as far as longitudinal movements are concerned. Inside this sleeve 37 there is provided a helical spring 38 the ends of which bear against discs 39—40 the outward displacements of which under the thrust of spring 38 are limited by abutments 41, 42 of sleeve 37. Two other abutments 43, 44 are fixed on a rod 45 which, on the one hand passes through discs 39, 40 and spring 38 and, on the other hand is connected to rod 15. Thus, every time 15 is stopped by one of the abutment surfaces 16, in one direction or the other, spring 38 is compressed if threaded rod 36 (Fig. 1) or rod 52 (Fig. 4) is given an axial movement exceeding the admissible displacement of rod 15.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A power plant for propelling a vehicle, and especially a boat, which comprises, in combination, a free piston auto-generator for supplying power gases, a first gas turbine, a shaft driven by said first gas turbine, a second gas turbine, a branched conduit between the delivery of the auto-generator and said turbines, said second turbine being operatively connected with said shaft so as to transmit thereto a torque opposed to that transmitted from the first mentioned turbine, and a control valve at the branching point of said conduit to distribute the power gases from the auto-generator between said turbines.

2. A power plant for propelling a vehicle and especially a boat, which comprises, in combination, a free piston auto-generator for supplying power gases, a shaft, two gas turbines adapted to be driven by the gases from said auto-generator and both operatively connected with said shaft for transmitting thereto opposed torques respectively, and valve means for connecting the delivery of said auto-generator with the intakes of said turbines, said valve means being adapted either to connect one turbine intake with said generator delivery while cutting off the other turbine intake from said generator delivery or to connect both of said turbine intakes with said generator delivery simultaneously and with variable respective sections of flow, means for adjusting the feed of fuel to said auto-generator, and a common control member for actuating both said fuel feed adjusting means and said valve means.

3. A power plant for propelling a vehicle and especially a boat, which comprises, in combination, a free piston auto-generator for supplying power gases, a shaft, two gas turbines adapted to be driven by the gases from said auto-generator and both operatively connected with said shaft for transmitting thereto opposed torques respectively, and valve means for connecting the delivery of said auto-generator with the intakes of said turbines, said valve means being adapted either to connect one turbine intake with said generator delivery while cutting off the other turbine intake from said generator delivery or to connect both of said turbine intakes with said generator delivery simultaneously and with variable respective sections of flow, means for adjusting the feed of fuel to said auto-generator, abutments for limiting the displacements of the last mentioned means, a control member for actuating said fuel feed adjusting means, and a transmission including an elastic device, between said control member and said fuel feed adjusting means.

4. A power plant for propelling a vehicle and especially a boat, which comprises, in combination, a free piston auto-generator for supplying power gases, a shaft, two gas turbines adapted to be driven by the gases from said auto-generator and both operatively connected with said shaft for transmitting thereto opposed torques respectively, and valve means for connecting the delivery of said auto-generator with the intakes of said turbines, said valve means being adapted either to connect one turbine intake with said generator delivery while cutting off the other turbine intake from said generator delivery or to connect both of said turbine intakes with said generator delivery simultaneously and with variable respective sections of flow, means for adjusting the feed of fuel to said auto-generator, abutments for limiting the displacements of the last mentioned means, a common control member for actuating both said fuel feed adjusting means and said valve means, and a transmission, including an elastic device, between said control member and said fuel feed adjusting means.

References Cited in the file of this patent

UNITED STATES PATENTS

| | | |
|---|---|---|
| 752,545 | Goede et al. | Feb. 16, 1904 |
| 2,061,902 | Hänschke | Nov. 24, 1936 |
| 2,355,177 | Pateras Pescara | Aug. 8, 1944 |
| 2,492,546 | Welsh | Dec. 27, 1949 |

FOREIGN PATENTS

| | | |
|---|---|---|
| 168,946 | Great Britain | Sept. 12, 1921 |
| 328,581 | Germany | Nov. 2, 1920 |